US007254749B2

United States Patent
Abrahams et al.

(10) Patent No.: US 7,254,749 B2
(45) Date of Patent: Aug. 7, 2007

(54) SYSTEM AND METHOD FOR STORAGE OF OPERATIONAL PARAMETERS ON COMPONENTS

(75) Inventors: Seth J. Abrahams, Livermore, CA (US); Brian D. Osterhout, Oakdale, CA (US); Michel M. Nguyen, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 892 days.

(21) Appl. No.: 10/271,491

(22) Filed: Oct. 16, 2002

(65) Prior Publication Data

US 2004/0078454 A1 Apr. 22, 2004

(51) Int. Cl.
*G06F 11/00* (2006.01)
(52) U.S. Cl. .............................. 714/47; 714/44; 710/18
(58) Field of Classification Search .................. 714/30, 714/48, 5, 47; 713/340; 702/188, 132, 182–1; 340/870.16–17
See application file for complete search history.

(56) References Cited

U.S. PATENT DOCUMENTS

| 5,115,225 | A | 5/1992 | Dao et al. |
| 6,266,203 | B1 * | 7/2001 | Street et al. .................. 360/69 |
| 6,404,707 | B1 * | 6/2002 | Kaneda et al. ........... 369/30.06 |
| 2002/0066047 | A1 | 5/2002 | Olarig et al. |
| 2002/0105748 | A1 | 8/2002 | Lamberts |
| 2003/0028829 | A1 * | 2/2003 | Slater et al. .................. 714/47 |

* cited by examiner

*Primary Examiner*—Robert Beausoliel
*Assistant Examiner*—Philip Guyton
(74) *Attorney, Agent, or Firm*—Robert C. Kowert; Meyertons, Hood, Kivlin, Kowert & Goetzel, P.c.

(57) ABSTRACT

A computer network may include one or more systems coupled to many components. The computer network may be a storage network that includes one or more systems connected to one or more storage systems. One or more components coupled to the computer network may be modular components such as field replaceable units (FRUs). A component may include a non-volatile memory that stores a value for an operational parameter of the component. The value for the operational parameter may specify an operating condition for the component. A monitor may be coupled to the component and may be configured to access the operational parameter value on the nonvolatile memory to determine if the component is operating outside of the specified operating condition.

33 Claims, 5 Drawing Sheets

SYSTEM AND METHOD FOR STORAGE OF OPERATIONAL PARAMETERS ON COMPONENTS

BACKGROUND

1. Field of the Invention

This invention relates to computer systems including networked systems, computers and/or storage systems. The invention further relates to accessing operational parameters that specify operating conditions for components within such systems.

2. Description of the Related Art

With the growing deployment of computer systems and software, applications often operate in distributed, heterogeneous environments. Processing in a complex application may be partitioned across network segments, CPU clusters and storage locations. Furthermore, computer systems in distributed, heterogeneous environments may include many different components that impact overall availability of the systems. The increasing complexity of software and the increasing degree of dependence on computer systems have imposed the adoption of various techniques to minimize system downtime.

One of the most cost-effective techniques, and also a major motivating factor behind the evolution of modular construction of computer systems, is the use of modular components. Within a computer system, a modular component may be the smallest unit that can be identified with a specification or by a supplier, distributed and redistributed, and added for expansion or replaced if faulty. A modular component may be any unit designed to be added or replaced at the location where the unit is operating. Such modular components may be referred to as field replaceable units (FRUs). The use of modular components helps to minimize downtime because modular components can be removed and replaced by a user or by trained service personnel without having to send the entire product or system to another facility.

Some modular components may be designed to operate under specific conditions. For example, some modular components may operate correctly only if the modular component operates within a specified temperature range and/or within a specified voltage range. Predefined conditions, such as temperature and voltage range, may be specified as operational parameters for a modular component.

A user may decide to upgrade older components with newer components. For example, a user may upgrade an older disk drive with a newer, faster disk drive. A temperature range allowed for the new disk drive may be different than a temperature range allowed for the old disk drive. Maximum heat load allowed for the new disk drive may be different than maximum heat load allowed for the old disk drive. Thus, although components may be the same type of component, operational parameters may vary between revisions of a component. For example, although an older disk drive and newer disk drive may be the same type of disk drive from the same vendor, operational parameters for an older disk drive version may be different than the operational parameters for a newer version of the disk drive.

Once a component is replaced with a different component or different component version, a different version of system software may be needed to operate the newer component. For example, system software may maintain a database of operational parameters for various components for use in monitoring or managing those components. If a component is changed, the system software may no longer have the correct operational parameters for that component. In a storage system the system software that uses operational parameters to manage or monitor a disk drive may be firmware or software on an array controller. A different version of the array controller's system software may be needed to operate a newer disk drive with different operational parameters than an existing disk drive. Therefore, each time a disk drive (or other component) is replaced with a disk drive (or other component) having different operational parameters, system software may need to be upgraded or replaced so that the system can manage or monitor the newer disk drive (or other component).

SUMMARY

One or more components coupled to a computer system may be modular components such as field replaceable units (FRUs). A component may include a nonvolatile memory that stores values for one or more operational parameters of the component. The values for the one or more operational parameters may specify operating conditions for the component. A monitor may be coupled to the component and may be configured to access the values on the non-volatile memory to determine if the component is operating outside of the operating conditions. The non-volatile memory may be flash memory, EEPROM, or other memory suitable for retaining the operational parameter values if power is turned off. The operational parameters may indicate voltage, frequency, input current, input power or other operating conditions for the component.

An array controller may include a monitor and the component may be a disk drive as part of a storage network. The monitor may be implemented in firmware. The monitor may be configured to send an error indication to a system error feature of an operating system if the component operates outside of the operating parameter values as specified on the non-volatile memory. The component may be replaced with a new component and the monitor may access different values for one or more operational parameters stored on a non-volatile memory included in the new component.

A storage device may include a non-volatile memory that stores values of operational parameters. The operational parameters may specify operating conditions for the storage device such as temperature and voltage. The storage device may include an interface that sends data between the storage device and one or more external devices coupled to the storage device. For example, the non-volatile memory may be configured to output the values of the operational parameters to each external device via the interface. The external device may be a monitor that is configured to requests the values of the operational parameters stored on the nonvolatile memory. The monitor may be configured to compare a current operating condition of the storage device to the operating condition specified by a value of the operational parameter. The monitor may also be configured to send an error indication to a system error feature of an operating system if the component operates outside of an operating parameter value as specified on the nonvolatile memory.

While the invention is described herein by way of example for several embodiments and illustrative drawings, those skilled in the art will recognize the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
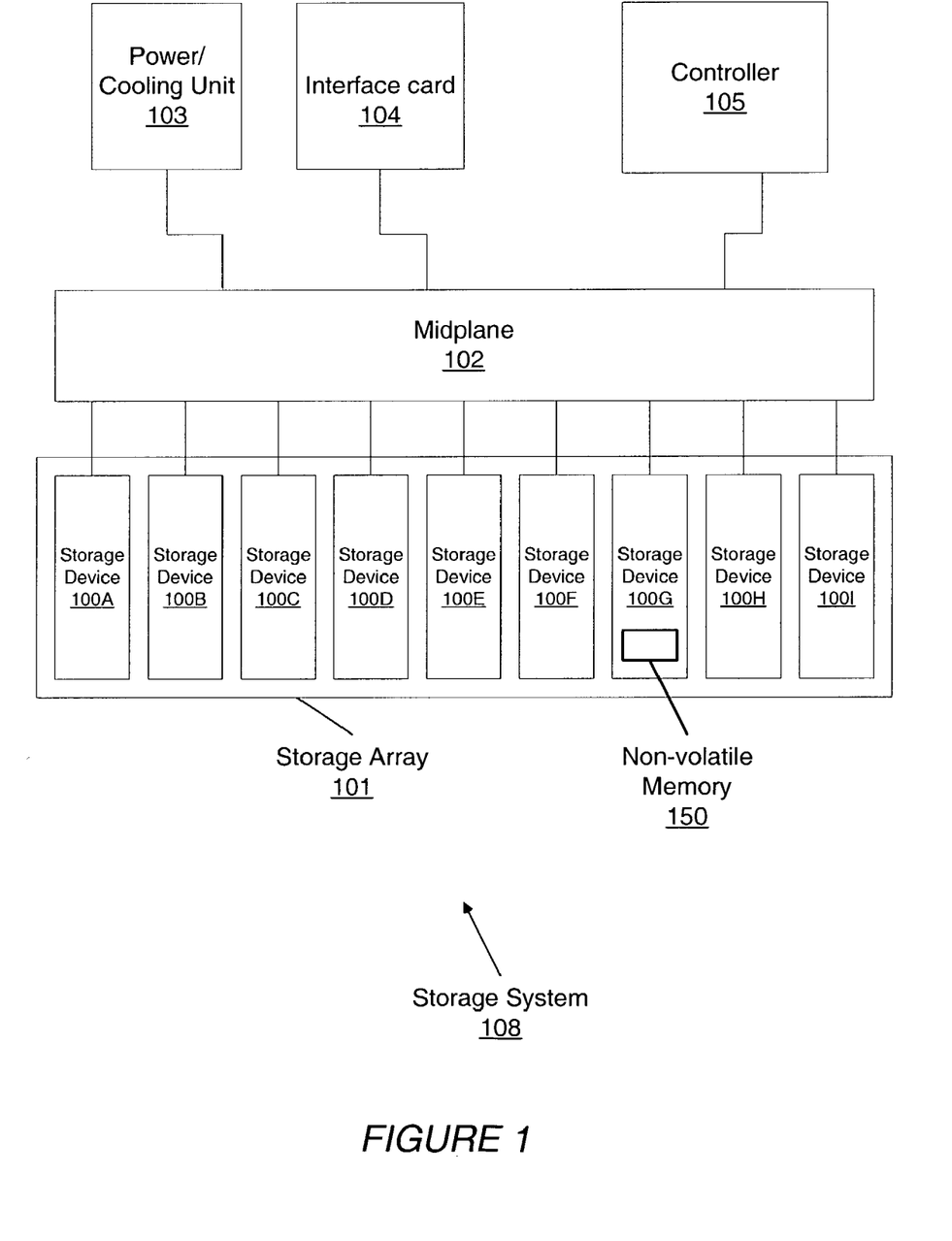
FIG. 1 illustrates a storage device that includes a non-volatile memory medium, according to one embodiment.

FIG. 1 illustrates a storage system 108 that includes a storage array 101 with multiple storage devices 100A-100I, a power/cooling unit 103, an interface card 104, a midplane 102 and an array controller 105. One or more components of the storage array 101, such as storage device 100G, may include one embodiment of a non-volatile memory 150 that is configured to store operational parameters for the component. These operational parameters may specify certain conditions for correct operation of a component such as storage device 100G. Some of the other components (e.g., controller 605) may also include a respective non-volatile memory 150 configured to store operational parameters for the component. In one embodiment, a non-volatile memory 150 configured to store operational parameters may be included in one or more components of a storage system 108. In other embodiments, a non-volatile memory 150 configured to store operational parameters may be included in one or more components of other computer systems such as networked systems. Thus, the components and storage system 108 of FIG. 1 illustrate only one example of a system and components including a non-volatile memory configured to store operational parameters for respective components.

The number and types of components coupled to a particular embodiment may vary. For example, storage system 108 may be a redundant array of inexpensive disks (RAID) storage subsystem or other type of storage array (e.g., a JBOD enclosure). In some embodiments, multiple host computers may communicate with several storage systems 108 via host adapters as part of a storage area network (SAN) or as network attached storage (NAS). In one embodiment, the storage system 108 may be built on a midplane design. Each type of storage device 100 in a physical midplane design may include a logic card for circuit functionality and a rear interface for mechanical and electrical interface to the midplane 102 (e.g., no internal cables). The physical midplane design may allow a specific storage device 100 to be installed or removed without affecting other storage devices in storage array 101 (e.g., hot swapping).

Contained within storage system 108 may be storage array 101 that includes a plurality of storage devices 100A-100I (collectively referred to as storage devices 100). Storage devices 100 are each modular components. Storage devices 100 may be, for example, magnetic hard disk drives, optical drives, magneto-optical drives, tape drives, solid state storage, or other non-volatile memory. The number of storage devices 100 in storage array 101 may vary. Storage system 108 may also include array controller 105 connected to each storage device 100 in storage array 101 via one or more communication links to provide communication between array controller 105 and storage devices 100 using various communication protocols.

One or more components coupled to storage system 108 may be modular components. Modular components may be any unit designed to be added or replaced at a location where the unit is operating. For example, a component may fail and the component may be removed and replaced with another component that operates correctly. A component may be added to a host to expand resources of the host. For example, a storage device 100 may be added to a storage system 108 to expand storage resources. Field replaceable units (FRUs) are examples of modular components.

A component may include non-volatile memory (e.g., flash memory or other non-volatile memory) that stores operational parameters for the component. The operational parameters may specify certain conditions for correct operation of the component. The component may have been designed to operate within the specified conditions. For example, the component may only be guaranteed to and/or expected to operate correctly if the component operates within a certain voltage range. Similarly, the component may only be guaranteed to and/or expected to operate correctly if the component operates within a certain temperature range. Predefined or specified conditions, such as error counts, temperature, current and voltage ranges, etc., may be specified as operational parameters for the component. The operational parameters may be specified by a manufacturer of the component, for example. A component may become inoperable or more likely to fail when the component operates outside of a range as specified by the operational parameters.

Operational parameters may be defined in various ways. The operational parameters may be specific to each type of component. For example, disk drives may have different operational parameters than array controllers. Operational parameters may include power, environmental, error or other conditions that may impact successful operation of a component. The following shows exemplary operational parameters for power and environmental conditions for one type of component. A minimum, maximum and/or critical value, for example, may be specified for each operational parameter.

| | |
|---|---|
| voltage and frequency | 100 to 240 VAC, 47 to 63 Hz |
| input current | 5 A maximum |
| input power | 450 W maximum |
| heat load | 1540 BTUs/hr maximum |
| temperature | 41 F. (5 C.) to 95 F. (35 C.) with maximum gradient 20 C. per hour |
| relative humidity | 20 to 80% nonconducting with maximum gradient 10% per hour |

Error counts are another type of operational parameter that may be predefined for different types of components. For example, the component may be defined as operating correctly if the number of errors within the component does not exceed a maximum error count. The error count may be specified as a percentage of allowable errors. Some operational parameters may also be specified to describe acceptable conditions for the component while the component is powered off. For example, the operational parameters that describe the acceptable temperature and humidity range while the component is powered off may be higher than those that describe the allowable temperature, humidity, etc. while being powered.

In addition to storage devices, some of the other components illustrated in FIG. 1 may include a respective non-volatile memory 150 that stores operational parameters for that component. The power/cooling unit 103 may be used to power the storage devices 100, and may include a power supply, cooling fans and an integrated battery backup. The power/cooling unit 103 may also include non-volatile memory 150 that stores operational parameters for the power/cooling unit 103. The interface card 104 may be a network interface card, fibre channel port card, loop card, etc. In some embodiments, the interface card 104 may include a non-volatile memory 150 that stores operational parameters for the interface card.

Figure 2:
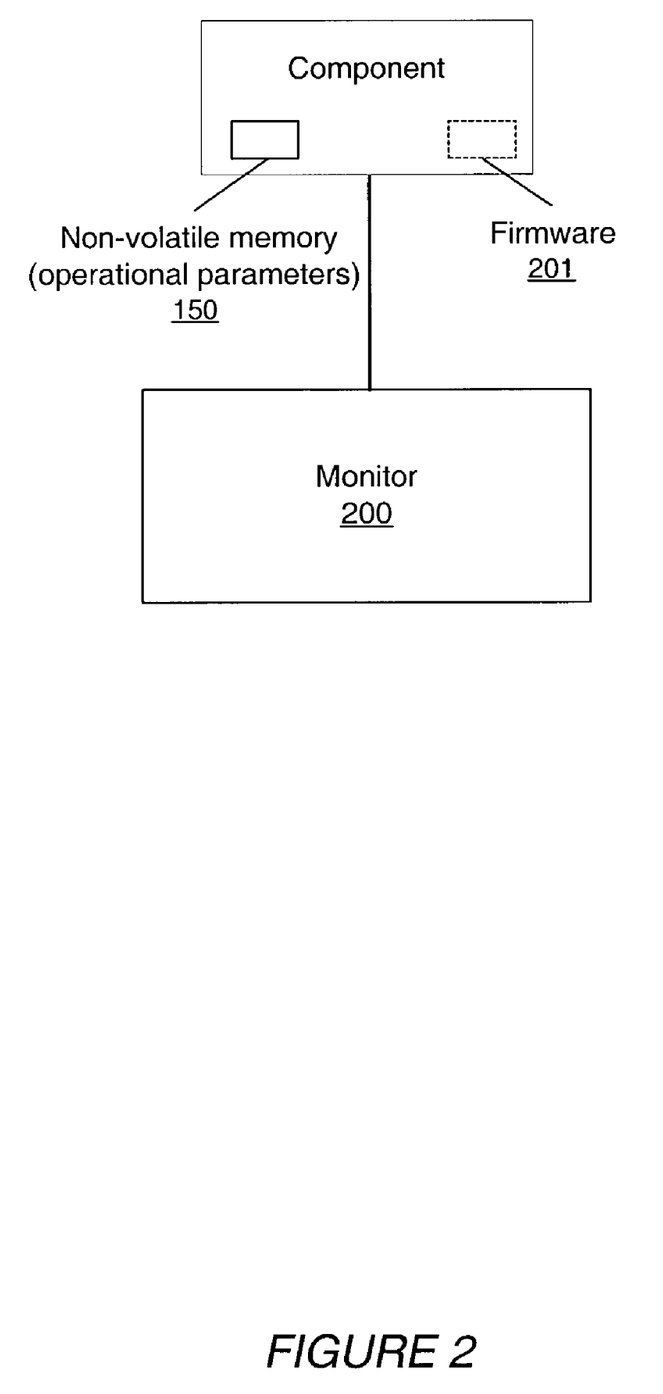
FIG. 2 illustrates a non-volatile memory medium included in a disk drive and the disk drive is coupled to a monitor, according to one embodiment.

FIG. 2 further illustrates one embodiment of a component that includes nonvolatile memory 150 for storing one or more of the component's operational parameters. Non-volatile memory 150 may store operational parameter(s) for the component (e.g., storage device 100G) and may retain the operational parameter(s) if the power is turned off. A monitor 200 may access the operational parameters stored on non-volatile memory 150. The monitor 200 may be part of system software that accesses a component's operational parameters to monitor or manage the component. The monitor 200 may be part of system software on a host computer or array controller. The component may also include firmware 201 that may access the non-volatile memory 150.

In one embodiment, non-volatile memory 150 may be a memory region of a larger non-volatile memory included in the component. Thus, non-volatile memory 150 may store other data in addition to storing operational parameters. Non-volatile memory 150 may be flash memory, electrically erasable programmable ROM (EEPROM), or other memory that retains the operational parameters if the power is turned off. In other embodiments, if the component is a storage device, the non-volatile memory 150 may be a portion of the storage medium included in that storage device. The non-volatile storage medium may be magnetic media such as a hard drive or optical storage. Non-volatile memory 150 may include other types of memory as well, or combinations thereof.

The operational parameters may be organized within non-volatile memory 150 in various ways. In one embodiment, the operational parameters may be stored as a two-column table. For example, one column may identify a particular value of an operational parameter and the other column may store a value associated with the operational parameter. The following shows exemplary operational parameter value identifiers and associated values for temperature.

| minimum temperature | 41 F. |
|---|---|
| maximum temperature | 60 F. |
| critical temperature | 95 F. |

In another embodiment, the operational parameters may be stored in a different format or data structure. For example, the operational parameters may be stored as a four-column table. Each row may include an operational parameter name and a minimum value, a maximum value and a critical value of the named operational parameter.

The component may also include firmware 201 as part of the component. Firmware 201 may access the operational parameter values stored on non-volatile memory 150. Firmware 201 may run control logic for the component. Thus, functionality used to control and operate the component may be included as part of firmware 201. Firmware 201 may only control and operate the component. For example, the component may be disk drive 100G from FIG. 1. Although storage networks or storage systems may include other components, or types of components, firmware 201 may only control and operate disk drive 100G. The operational parameter values may be stored on non-volatile memory 150 separately from firmware 201.

Monitor 200 may monitor the operation of the component. In one embodiment, monitor 200 may be firmware used to further control and/or manage the component. For example, monitor 200 may be firmware executing on an array controller used to further control and manage the component, where the component is a disk drive. The monitor may access the operational parameters on non-volatile memory 150 to determine if the component is operating outside of specified conditions. For example, where the component is a disk drive, monitor 200 may be configured to alert a host within a storage network, for example, if the component operates outside of conditions specified by the operational parameters for the component. For example, monitor 200 may alert the host if the component begins operating outside of a temperature range specified by operational parameters stored on non-volatile memory 150.

In one embodiment, monitor 200 generate an error message if it detects a component operating outside of an operational parameter as accessed from the nonvolatile memory 150 for the component. For example, in the embodiment of a storage system, the monitor may send the error message to a host in a storage area network In one embodiment, the error message may be sent to a standard input/output (I/O) device such as a system error feature or a system logging feature of an operating system. The system logging feature, after receiving the error message, may send the error message to a system logging daemon. The system logging daemon may read and log messages to a system console, log files, other computers and/or users as specified by a configuration file of the system logging daemon. The system logging daemon may wait for incoming messages and direct the messages to possible output locations. In one embodiment, a software program external to monitor 200 may be one of many output locations. For example, an external software program may receive the error messages logged by monitor 200.

Monitor 200 may be application software, part of an application software package or some other module used to monitor components. Monitor 200 may be part of firmware on a component other than the component(s) being monitored. In one embodiment, monitor 200 may be configured to monitor one or many components of a storage system or network. The monitor 200 may cache the operational parameter values at power-up to reduce read traffic when evaluating if a component is operating outside of specified conditions. In one embodiment, monitor 200 may be part of firmware 201 on a component and firmware 201 may be configured to monitor the component using the operational parameter values stored on non-volatile memory 150.

Monitor 200 may be configured to access the operational parameter values stored in non-volatile memory 150. For example, a component may be upgraded to a newer component, and monitor 200 may access different operational parameter values for the newer component from the non-volatile memory 150 on the newer component. Monitor 200 may be able to access new operational parameters without having to be updated itself (e.g., by downloading and/or installing a new version). Thus, in some embodiments, storing operational parameter values on non-volatile memory 150 may eliminate the need to update monitor 200 each time the operational parameter values change.

Figure 3:
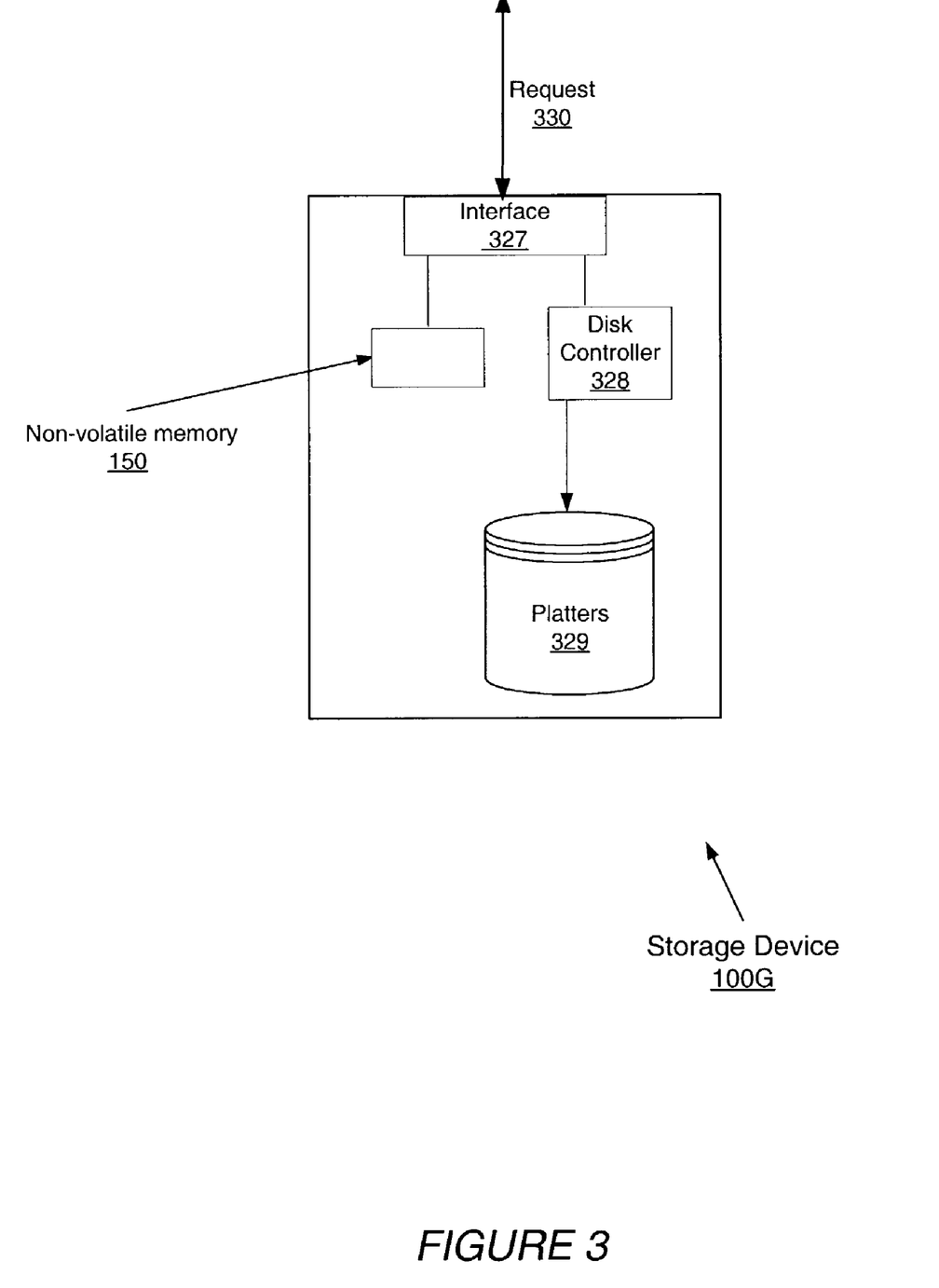
FIG. 3 further illustrates the disk drive that includes the non-volatile memory medium, according to one embodiment.

FIG. 3 further illustrates one embodiment of the non-volatile memory 150 included in the storage device 100G, as described with FIG. 2. Non-volatile memory 150 may store operational parameters for the storage device 100G. The storage device 100G may also include an interface 327, a disk controller 328 and platters 329. The storage device 100G may include other components (e.g., read and write heads, spindle) in addition to those shown in FIG. 3. The interface 327 may be used for communication between the storage device 100G and other components (e.g., an array controller). In some embodiments, the interface 327 may be an interface such as Integrated Drive Electronics (IDE), Small Computer System Interface (SCSI), Fibre Channel, etc. In other embodiments any suitable communication interface may be used.

The disk controller 328 may be used to access the platters 329 that store data of the storage device 100G. For example, the disk controller 328 may access data from the platters 329 via control of read/write heads. An external device (e.g., a monitor or array controller) may request (e.g., request 330) operational parameters from the non-volatile memory 150 via the interface 327. In one embodiment, a component that includes a nonvolatile memory 150 may be configured to output the operational parameter values via the interface 327 in response to a request. For example, the storage device 100G may be configured to send the operational parameter values to an external device via the interface 327. In one embodiment, the operational parameters may be read from non-volatile storage included in a component when an external device detects or is notified that the component has been changed or replaced. For example, the external device may detect a change event or message for the component via the interface 327 over a network.

Figure 4:
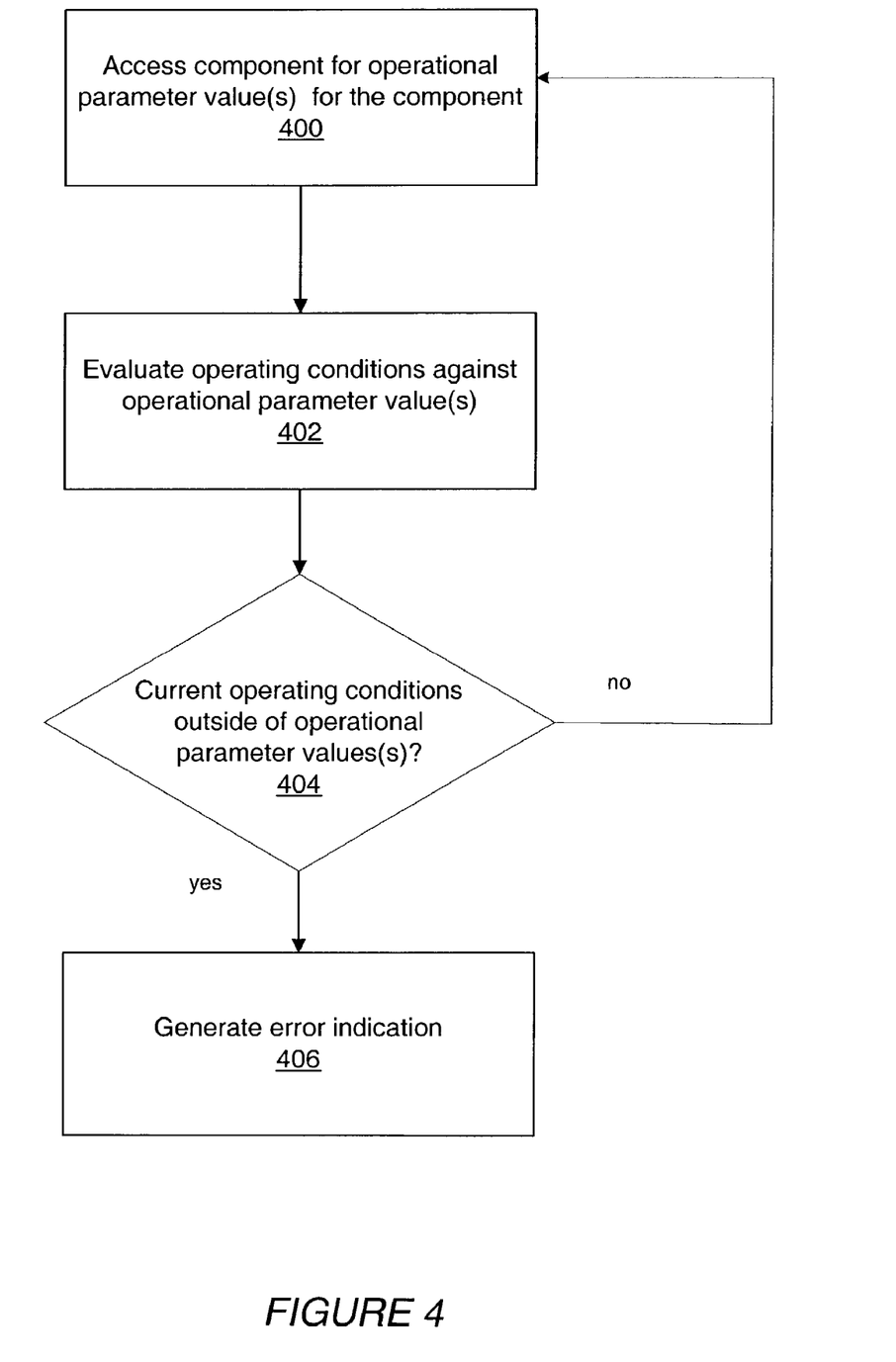
FIG. 4 shows one embodiment of a method for monitoring operating conditions of a component that includes a non-volatile memory.

The flowchart of FIG. 4 illustrates one embodiment of a method for monitoring operating conditions of a component that includes a non-volatile memory. Operational parameter values for the component may be stored on non-volatile memory. For example, a manufacturer of the component may store the operational parameter values on non-volatile memory. One or more operational parameter values stored on non-volatile memory of the component may be accessed for the component, as indicated in 400. In one embodiment, a monitor (e.g. monitoring function within system software) may provide functionality to monitor the component. For example, a monitor may access the non-volatile memory of the component to obtain the operational parameter values. The monitor may read the operational parameters into a local memory from which it operates. In one embodiment, the operational parameters may be read from their non-volatile storage on the component each time the system including the monitor is restarted or rebooted. In one embodiment, the operational parameters may be read from a non-volatile storage included in the component when the monitor detects or is notified that the component has been changed or replaced. For example, the monitor may detect a change event or message for the component over a network or fabric, or a user may initiate the notification upon changing or replacing the component. In another embodiment, operational parameters from components' non-volatile memory may be read periodically, or at various time intervals, to detect changes in the parameters.

The monitor may access the operational parameter values on non-volatile memory to evaluate if the component is operating within specified conditions, as indicated in 402. In one embodiment, the monitor may be part of firmware used to control and manage the component. The monitor may be application software, part of an application software package or some other module used to monitor the component.

The monitor may be configured to identify if the component operates outside of conditions as specified by the operational parameter values for the component, as indicated in 404. For example, the monitor may determine the component is operating outside of a specified voltage range value stored on non-volatile memory. To identify if the component is operating outside of acceptable conditions, the monitor may compare a current operating condition (e.g., measured by the component or a different device such as a thermometer) to a minimum voltage operational parameter value. The monitor may access the minimum voltage value from the non-volatile memory included in the component.

In one embodiment, the monitor may alert the system if the component begins operating outside of specified conditions. For example, the monitor may generate an error notification if the component is operating outside of specified conditions, as indicated in 406. The monitor may send an error message to a computer system. In one embodiment, the error message may be sent to a standard input/output (I/O) interface such as a system error feature or a system logging feature of an operating system. The monitor may send a failure message to a software program external to the monitor. The monitor may send different types of messages depending on which operational parameters are exceeded. For example, the monitor may send a particular message if a critical operational parameter is exceeded. An external software program may perform remedial functions in response to the monitor's alert. For example, an external software program may be configured to shut down a component after receiving a particular message from the monitor that a critical operational parameter is exceeded. In other embodiments, the monitor may be configured to perform remedial functions. The monitor may be configured to continually or periodically evaluate current conditions to specified conditions, as indicated in 404.

Figure 5:
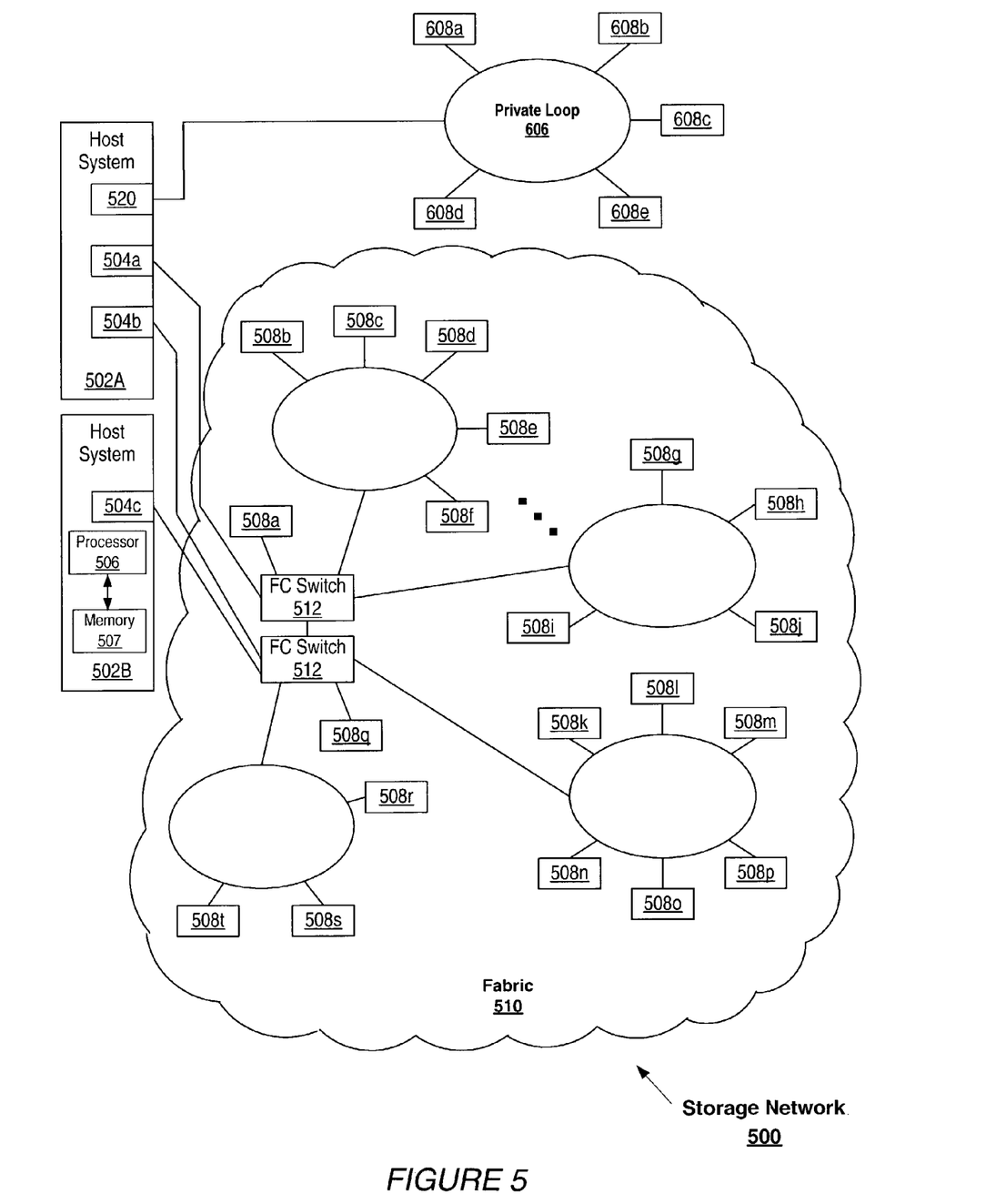
FIG. 5 illustrates an exemplary system in which components may store operational parameters, according to one embodiment.

FIG. 5 illustrates one example of a storage network (e.g. a SAN) including components having non-volatile memories for storing operational parameters for the respective component, according to one embodiment. A storage network 500 may include a direct attached private loop 606 and a fabric 510. Storage network 500 may also include one or more hosts 502 connected to one or more storage systems 508 and 608. A host 502 may include devices such as memory 507, a central processing unit (CPU) or processor 506, and host adapters 504 and 520. Some embodiments of storage network 500 may include a different number of hosts, components, or types of components than shown in FIG. 5. Some hosts within storage network 500 may include other components such as application software, other CPUs, video monitors or other displays, track balls, mice, keyboards, printers, plotters, scanners, or other types of I/O devices for use by hosts within storage system 500.

One or more components coupled to the storage network 500 may be modular components. The one or more modular components may each include a respective nonvolatile memory (e.g., flash memory or other non-volatile memory) that stores operational parameters for that component. For example, a display device such as a video monitor may include a non-volatile memory medium that stores operational parameters for the video monitor. Each storage device 508 and 608 may include a respective non-volatile memory configured to store operational parameters for that storage device. The operational parameters may specify certain conditions for correct operation of the component.

The storage network 500 may be configured in a variety of different ways and may include one or more direct attach devices, storage area networks (SANs), and/or network attach devices (NAS). Storage network 500 may include fibre channel technologies. The storage network 500 may not be limited to fibre channel technologies and architectures but may include various types of technologies. For example, some or all of the storage network 500 may be based on the InfiniBand™ architecture or Small Computer System Interface over IP (iSCSI). The storage network 500 may include various types of topologies (e.g., geometric arrangements of components in the network), protocols (e.g., rules and encoding specifications for sending data), and media (e.g., twisted-pair wire, coaxial cables, fiber optic cables, radio waves).

In some embodiments, more than one host may communicate with more than one storage system via one or more connections. Host adapter 520 couples host system 502A to private loop 606 and adapters 504a and 504b couple host system 502A to fabric 510. Coupled to private loop 606 are one or more direct attach devices 608. Direct attach device(s) are considered local to host system 502A. Host 502B may access other types of components such as network adapters or other network devices.

The host system 502B may be coupled to fabric 510 via host adapter 504c. Fabric 510 may include fibre channel switches 512 which are coupled to multiple fabric devices 108. Each fibre channel switch 512 may connect to various fibre channel topologies such as point-to-point fibre channel connections or fibre channel loops. Each switch 512 may also connect to one or more other fibre channel switches. The fabric devices 108 may include various storage devices such as storage systems, hard disk drives, optical drives, tape drives, etc., any of which may include a non-volatile memory 150 for storing operation parameter for that component.

In different embodiments, a device that includes modular components having a non-volatile memory configured to store operational parameters for the modular components may take various forms, including a personal computer system, desktop computer, notebook computer, workstation, server, mainframe computer system, network appliance, network computer, storage system, Internet appliance, personal digital assistant (PDA), embedded device, smart phone, television system, another suitable device, or combinations thereof. In general, the term computer system may be broadly defined to encompass any device having a processor which executes instructions from a computer accessible medium such as memory. A computer system may be attached to a network as part of a distributed computing environment.

Note that the flow charts described herein represent exemplary embodiments of methods. The methods may be implemented in software, hardware, or a combination thereof. The order of method may be changed, and various elements may be added, reordered, combined, omitted, modified, etc. For example in FIG. 4, an error message may be sent (406) for a different component than the component currently being evaluated before, after or during identification that the component is operating outside of specified operational parameters (404).

Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer accessible medium. Generally speaking, a computer accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A system, comprising:
   a plurality of components, wherein each one of the plurality of components comprises a non-volatile memory, wherein each non-volatile memory stores a value of an operational parameter that specifies an operating condition for its respective component; and
   a monitor coupled to and separate from each of the plurality of components, wherein the monitor is configured to access the value of the operational parameter stored on each non-volatile memory, wherein the monitor is configured to compare a current operating condition of each of the plurality of components to the operating condition specified by the respective value of the operational parameter.

2. The system as recited in claim 1, wherein at least one of the operational parameters is a temperature parameter.

3. The system as recited in claim 1, wherein at least one of the operational parameters is a voltage parameter.

4. The system as recited in claim 1, wherein at least one of the non-volatile memories stores a minimum value and a maximum value of the operational parameter.

5. The system as recited in claim 1, further comprising a storage array controller, wherein the storage array controller includes the monitor, and wherein at least one of the plurality of components is a disk drive.

6. The system as recited in claim 1, wherein the monitor is configured to send an error indication to a system error feature if at least one of the plurality of components operates outside of the operating condition specified by the respective value of the operating parameter.

7. The system as recited in claim 1, wherein at least one of the non-volatile memories comprises a flash memory device.

8. The system as recited in claim 1, wherein at least one of the plurality of components is a disk drive and wherein the corresponding non-volatile memory comprises a region of a storage disk included in the disk drive.

9. The system as recited in claim 1, wherein at least one of the non-volatile memories stores data other than operational parameter values.

10. The system as recited in claim 1, wherein the monitor is configured to access at least one of the plurality of components over a network.

11. The system as recited in claim 10, wherein the network is part of a storage area network (SAN), wherein at least one of the plurality of components is a storage device.

12. The system as recited in claim 1, wherein at least one of the plurality of components is a field replaceable unit (FRU).

13. The system as recited in claim 1, wherein in response to at least one of the plurality of components being replaced with a new component, the monitor is configured to access a different value for the operational parameter stored on a non-volatile memory included in the new component.

14. The system as recited in claim 1, wherein at least one of the non-volatile memories stores one or more values of each of a plurality of operational parameters.

15. A method, comprising:
a monitor reading a value of an operational parameter for each one of a plurality of components from a respective non-volatile memory included in each one of the plurality of components, wherein the monitor is coupled to and separate from each one of the plurality of components; and
the monitor comparing a current operating condition of each one of the plurality of components to an operating condition specified by the value of the operational parameter from the respective non-volatile memory included in each one of the plurality of components.

16. The method as recited in claim 15, wherein at least one of the operational parameters is a temperature parameter.

17. The method as recited in claim 15, wherein at least one of the operational parameters is a voltage parameter.

18. The method as recited in claim 15, further comprising reading a minimum value and a maximum value of the operational parameter from at least one of the non-volatile memories.

19. The method as recited in claim 15, wherein an array controller includes the monitor, wherein at least one of the plurality of components is a disk drive coupled to the array controller.

20. The method as recited in claim 15, further comprising: generating an error indication if at least one of the plurality of components operates outside of the operating condition specified by the respective value of the operating parameter.

21. The method as recited in claim 15, wherein at least one of the non-volatile memories is a flash memory device.

22. The method as recited in claim 15, wherein at least one of the plurality of components is a field replaceable unit (FRU).

23. The method as recited in claim 15, further comprising: replacing at least one of the plurality of components with a respective new component; and the monitor accessing a different value of an operational parameter stored on a non-volatile memory included in the respective new component.

24. The method as recited in claim 15, further comprising: storing one or more values of each of a plurality of operational parameters in at least one of the non-volatile memories.

25. A computer accessible storage medium, comprising instructions executable by one or more processors to implement a monitor configured to:
access a value of an operational parameter stored on a non-volatile memory included in each one of a plurality of components, wherein the monitor is separate from each one of the plurality of components; and
compare a current operating condition of each one of the plurality of components to an operating condition specified by the value of the operational parameter stored in the non-volatile memory included in each one of the plurality of components.

26. The computer accessible storage medium as recited in claim 25, wherein at least one of the operational parameters is a temperature parameter.

27. The computer accessible storage medium as recited in claim 25, wherein at least one of the operational parameters is a voltage parameter.

28. The computer accessible storage medium as recited in claim 25, wherein the instructions are further executable to read a minimum value and a maximum value of the operational parameter from at least one of the non-volatile memories.

29. The computer accessible storage medium as recited in claim 25, wherein the instructions are further executable to generate an error indication if at least one of the plurality of components operates outside of the operating condition specified by the respective value of the operating parameter.

30. The computer accessible storage medium as recited in claim 25, wherein at least one of the non-volatile memories is a flash memory device.

31. The computer accessible storage medium as recited in claim 25, wherein at least one of the plurality of components is a field replaceable unit (FRU).

32. The computer accessible storage medium as recited in claim 25, wherein the instructions are executable to access a different operational parameter value from a non-volatile memory if a respective one of the plurality of components is replaced with a respective new component.

33. The computer accessible storage medium as recited in claim 25, wherein the instructions are further executable to read one or more values of each of a plurality of operational parameters from at least one of the non-volatile memories.

* * * * *